United States Patent [19]

Angle et al.

[11] Patent Number: 5,873,078
[45] Date of Patent: Feb. 16, 1999

[54] RADIX TREE SEARCH LOGIC

[75] Inventors: Richard L. Angle, Wellesley; Edward S. Harriman, Jr., Bedford; Geoffrey B. Ladwig, Chelmsford, all of Mass.

[73] Assignee: Bay Networks, Inc., Santa Clara, Calif.

[ * ] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,857,196.

[21] Appl. No.: 684,224

[22] Filed: Jul. 19, 1996

[51] Int. Cl.$^6$ .................................................. G06F 17/30
[52] U.S. Cl. ................................................ 707/3; 707/102
[58] Field of Search ...................... 395/613, 603; 707/3, 102

[56] References Cited

U.S. PATENT DOCUMENTS

| | | | |
|---|---|---|---|
| 4,468,728 | 8/1984 | Wang | 395/601 |
| 4,774,657 | 9/1988 | Anderson et al. | 395/62 |
| 5,261,088 | 11/1993 | Baird et al. | 395/622 |
| 5,333,317 | 7/1994 | Dann | 395/605 |
| 5,487,164 | 1/1996 | Kirchhofer et al. | 395/607 |
| 5,546,390 | 8/1996 | Stone | 370/408 |
| 5,557,786 | 9/1996 | Johnson, Jr. | 395/612 |
| 5,651,099 | 7/1997 | Konsella | 395/13 |
| 5,727,201 | 3/1998 | Burke | 707/10 |

*Primary Examiner*—Wayne Amsbury
*Attorney, Agent, or Firm*—Blakely, Sokoloff, Taylor & Zafman, LLP

[57] ABSTRACT

In a search method for a radix search tree, a logic circuit for computing the actual offset of an entry in a node in a tree. The logic circuit accepts a pointer to a node in the tree, along with an associated bit mask indicating which entries are present in the node. The logic circuit further receives an entry value, the offset of which from the beginning of the node is to be computed by the logic circuit. The logic circuit utilizes Boolean AND gates to mask off higher order bits in the bit mask above the bit position corresponding to the entry value received by the logic circuit. The lower order bits in the bit mask, up to but not including the bit position corresponding to the entry value, are added together to determine the number of entries that exist at a lower offset in the node than the entry indicated by the entry value. The logic circuit combines the pointer received with the sum computed to calculate the offset memory address at which the entry is located in the node.

11 Claims, 4 Drawing Sheets

RADIX TREE SEARCH LOGIC

BACKGROUND OF THE INVENTION

1. Field of the Invention

The present invention is related to the field of data structures stored in a memory of a computer system. More specifically, the present invention is related to a method for efficiently storing a key of tables in a memory of a computer system through the use of an improved radix search tree.

2. Description of the Related Art

There are numerous prior art methods for searching for data in a data structure stored in a memory of a computer system to find a particular item of information. Certainly, it is appropriate to implement methods for organizing and searching for data in the data structure in a way that reduces the amount of memory required to store the data and perform the search in a more efficient manner.

Before discussing the prior art methods, a brief mention of terms commonly used in the description of data structures and search techniques performed thereon is in order.

A table or a file is a group of data elements, each of which may be called an entry or a record in the table. Generally, a key is associated with each record. The key is used to differentiate among different records. The key associated with a particular record may or may not need to be unique, depending on the search method utilized in accessing the table. Furthermore, the key may or may not be embedded within the record itself.

A search method accepts a key value as input and attempts to locate a record within a table stored in the memory of a computer system whose associated key is the key value. The search method may return a record, or a pointer to the record. The contents of the record may be data, program code, or a pointer to either data or program code. If the search of a table is unsuccessful in finding the key, then there is no record in the table associated with the key value. Typically, if the search is unsuccessful, an insertion is performed to add a new record with the key value as its key.

A table is stored in a data structure in the memory or an external storage, e.g., magnetic disk, of a computer system. The form of the data structure may be an array of records, a tree, a linked list, etc. Certain search methods are generally more applicable to one form and location of a data structure than another. Thus, the data structure in which a table is stored is, in part, selected according to the search method to be used to access information within the table. The present invention is related to search operations on a file or table that is organized as a tree structure.

A prior art search method utilizes a tree to facilitate searching a table stored in the memory of a computer system. The prior art search method forms a tree based on symbols of which the keys are comprised. This is generally referred to as a radix search tree. For example, if the key is comprised of the hexadecimal characters 0 through F, each successive hexadecimal digit position in the key determines 1 of 16 possible sons of a given node in the tree.

A table 100 comprising a set of keys is illustrated in FIG. 1A. For purposes of example, the set of keys in the table are comprised of from two to four hexadecimal digits. However, it is understood by those of ordinary skill in the related arts that the keys could conceivably be of any length, or all the same length. Moreover, the table typically has substantially more keys than presented in this example.

The tree illustrated in FIG. 1B, referred to generally as 111, represents a radix search tree. The tree 111 organizes the set of keys listed in the table of keys illustrated in FIG. 1A to facilitate the radix search method. Taking, for example, the first key in the table at 101, i.e., key 14(h), a root node 110 in the tree 111 points to a son node 120 at which is stored the first hexadecimal symbol 1 in the key. Node 120, in turn, points to the hexadecimal symbol 4 at node 121. Since the hexadecimal symbol 4 is the last symbol in the key 14(h), the node 121 points to a son node 150 indicating the end of a key (eok) has been reached. Node 120 also points to another son node 122, in which is stored the hexadecimal value 6 corresponding with the second symbol value in the keys 160(h) at location 102, 16E(h) at location 103, and 16E9(h) at location 104 in the table 100. Node 122, in turn, points to son nodes 123 and 124. The symbol stored in node 123 corresponds to the third symbol having a value of 0(h) in key 160(h) at location 102 in table 100. The symbol value E(h) stored in node 124 corresponds to the third symbol in keys 16E(h) and 16E9(h) at locations 103 and 104, respectively, in table 100. Finally, node 124 points to son node 125, in which is stored the last symbol value of 9(h) in the key 16E9(h) at location 104 in table 100. The end of the string of symbols 1(h), 6(h) and 0(h) representing the key 160(h) is indicated by the end of key (eok) stored in node 151, which is the son of node 123. The string of symbols representing the key 16E9(h) is likewise terminated by an eok at node 152. The other subtrees illustrated at 130 and 140 are organized in a similar fashion to the subtree illustrated at 120.

As mentioned above, the leaf nodes in FIG. 1B, e.g., nodes 150, 152, 153, etc., represent the end of a key. The leaf nodes generally contain a pointer to a record or entry that is being stored in the memory of a computer system. However, it is conceivable that the leaf node may store the pointer to a program code segment. A software program controlling the computer system to perform the search could then cause the computer system to jump to the program code segment pointed to by the pointer for further program execution.

Note that while the keys illustrated in FIG. 1A consist of the 16 hexadecimal characters 0–F, the keys could also be represented by some other set of characters. For example, if the keys consist of the English language alphabetic characters A–Z, each letter of the alphabet determines a branch in a tree. In other words, each node in the tree 111 can contain m pointers, corresponding to m possible symbol values in each position of the key. Thus, if the keys were alphabetic, there would be 26 pointers in each node, each pointing to a son node, where each son node corresponds to one of 26 possible symbol values.

FIG. 2A illustrates the partial memory layout 200 for the nodes in a radix search tree data structure in which is stored the table 100 in a memory of a computer system. Since the keys in table 100 are hexadecimal, there are 16 memory locations required for each node in order to provide 16 pointers to 16 possible son nodes in the tree 111. For example, symbol value 1(h) in node 201 can be followed by any one of 16 hexadecimal symbol values, each represented by a different son node. Thus, 16 memory locations are reserved at memory block 210 for pointers to the 16 possible different son nodes.

Symbol value 2(h) in node 201 represents a different branch in the tree, and can also be followed by any one of 16 different hexadecimal symbol values. Hence, 16 memory locations are allocated at memory block 240 for storing a pointer to a potential son node which, in turn, stores a symbol following the symbol value 2(h). As illustrated in FIG. 2, three of the memory locations at memory block 240 contain pointers to the next symbols in the keys 1A(h), 214(h) and 2BF5(h) in table 100.

Moreover, in addition to the 16 memory locations reserved for pointers at each node in the tree, there may be an extra pointer corresponding to an end of key or a flag with each pointer indicating that the pointer points to a record or program code segment rather than another node in the tree.

Of particular importance is the fact that a pointer in a node is associated with a particular symbol value based on the location of the pointer, i.e., based on the offset, or location, of the pointer relative to the first pointer at the first memory location in the node. In other words, the first pointer corresponds to the first possible symbol value, in this case, 0(h), while the second pointer corresponds to the second possible symbol value, i.e., 1(h), etc. Thus, it is unnecessary to store the actual symbol values in the nodes of the tree. Rather, only a pointer to a son node corresponding to the symbol value is required. From the location of the pointer, it can be determined the symbol value corresponding to the son node pointed at by the pointer. However, if the symbol values are not stored in the nodes of a tree, it is paramount that a memory location for each possible pointer, whether or not that pointer is ever utilized, be reserved in each node.

Given this requirement, it is clear that when the set of keys in a table is sparse, as in the case of the set of keys in table 100, the prior art method of storing a table of keys in a tree for later radix searching wastes a large amount of memory space. What is needed, therefore, is a method for storing information in a tree structure in the memory of a computer system and for subsequently searching the tree such that the amount of memory required to store a sparse table of keys is minimized.

Moreover, what is needed is an apparatus for carrying out the method for searching the tree in the memory of a computer system in such a way that the method operates in a fast, efficient manner.

SUMMARY OF THE DISCLOSURE

The present invention provides a computer implemented method for searching for a key in a radix search tree in a memory of a computer system. A table of keys is organized in a radix search tree. The radix search tree is stored in a memory of a computer system. Each of the keys in the table are divided into a string of n symbols. Each node in the tree corresponds to a symbol. Thus, a tree of depth n is needed to store a key divided into a string of n symbols. In other words, A path from a root node to a leaf node at level n in the tree represents a string of n symbols comprising a key.

Each node in the tree contains at least one entry having stored therein a pointer to a son node. Each node is capable of having m possible entries corresponding to m possible symbol values. However, only those entries for which a corresponding symbol exists in the string of symbols comprising a key are allocated in memory. To that end, in the preferred embodiment, each entry in a node comprises a pointer to a son node and an existence map indicating which entries exist in the son node. In the preferred embodiment, the existence map is a bit mask that indicates, based on bit positions enabled and disabled in the bit mask, which entries exist in the son node pointed to by the pointer. By providing an existence map along with the pointer to a son node, m memory locations for m entries are allocated for the son node only if all of the m possible entries are used. By allocating memory locations only for entries in a node that are not empty, the preferred embodiment of the present invention minimizes memory resources required by a radix search tree.

The present invention further provides an apparatus for conducting the search of the radix search tree in memory in a fast, efficient manner. In the search method of the preferred embodiment provided below, a tradeoff exists between the speed of the search and utilization of memory resources. By providing an existence map, memory space is conserved, but the search process takes longer because of the additional computations performed by the processor in connection with reading and processing the existence map. The additional overhead required by the search method to account for and process the existence map slows down the search method. This problem is overcome by providing logic to perform the search method. The logic circuit embodied by the present invention calculates the correct offset for an entry in a node.

BRIEF DESCRIPTION OF THE DRAWINGS

The present invention is illustrated by way of example and not limitation in the following figures. Like references indicate similar elements, in which.

DETAILED DESCRIPTION OF THE EMBODIMENTS OF THE INVENTION

What is described herein is a method for efficiently storing a key of tables in a memory of a computer system. The method stores a table of key in an memory efficient radix search tree and performs an improved radix search method to locate information stored in the tree. In the following description, numerous specific details are set forth in order to provide a thorough understanding of the present invention. It will be apparent, however, to one of ordinary skill in the art that the present invention may be practiced without these specific details. In other instances, well-known conventions, structures, and techniques have not been shown in order not to unnecessarily obscure the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Hardware Overview

Figure 3:
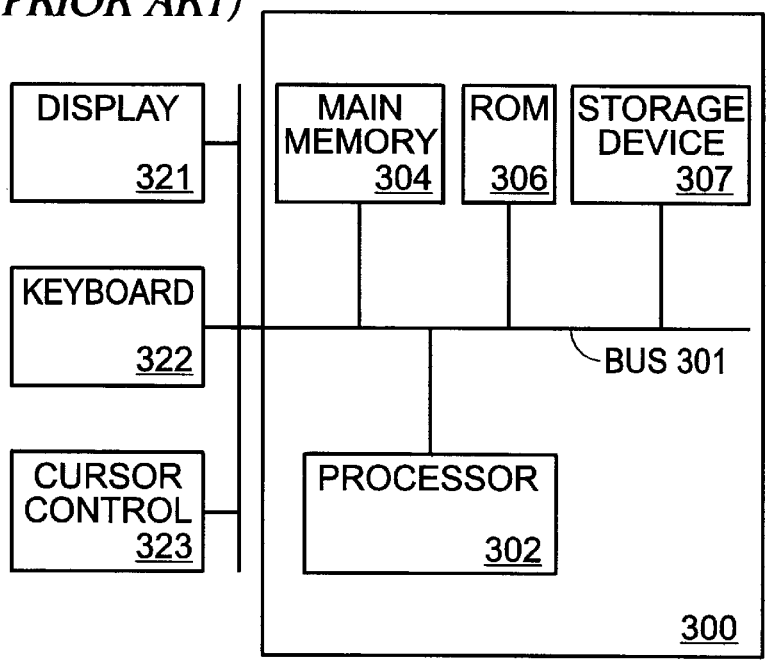
FIG. 3 illustrates a computer system upon which an embodiment of the present invention may be implemented.

Referring to FIG. 3, a computer system upon which the preferred embodiment of the present invention can be implemented is shown as 300. Computer system 300 comprises a bus or other communication means 301 for communicating information, and a processing means 302 coupled with bus 301 for processing information. System 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302. Data storage device 307 is coupled to bus 301 for storing information and instructions.

A data storage device 307 such as a magnetic disk or optical disk and its corresponding disk drive can be coupled to computer system 300. Computer system 300 can also be coupled via bus 301 to a display device 321, such as a cathode ray tube (CRT), for displaying information to a computer user. An alphanumeric input device 322, including alphanumeric and other keys, is typically coupled to bus 301 for communicating information and command selections to processor 302. Another type of user input device is cursor control 323, such as a mouse, a trackball, or cursor direction keys for communicating direction information and command selections to processor 302 and for controlling cursor movement on display 321. This input device typically has two degrees of freedom in two axes, a first axis (e.g., x) and a second axis (e.g., y), which allows the device to specify positions in a plane.

Preferred Embodiment of the Present Method

Figure 1A:
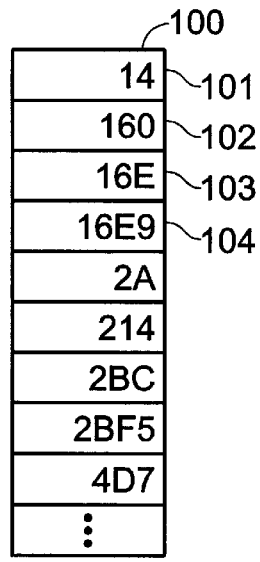
FIG. 1A is an illustration of a table of keys as may be utilized by a search method to locate information in a data structure in the memory of a computer system.

As discussed above in connection with FIGS. 1–2, a radix search tree suitable for the radix search method has the disadvantage of memory inefficiency primarily because the nodes in the tree are allocated m entries which require m memory locations to store pointers to m possible son nodes. Regardless of whether the memory locations are actually used or not, m entries must be reserved for pointers to son nodes corresponding to m possible symbol values. This disadvantage is particularly acute for a tree in which is stored a sparse table, i.e., a table where the number of keys in the table is relatively small in comparison to the possible set of keys. As a result, the preferred embodiment of the present invention is utilized to eliminate the need to reserve memory for empty entries.

As a brief overview of the preferred embodiment of the present invention, a tree of n levels is created in which to organize the keys in a table, e.g., table 100. The levels n, or depth of the tree, is determined by the number of symbols in the largest key in the table. For example, if the keys in the table are comprised of at most four symbols, then n=4. Each node in the tree is capable of having m entries, where m indicates the possible symbol values. For example, if a key is comprised of a string of hexadecimal digits, a symbol representing a hexadecimal digit can be one of 16 values, namely, 0(h) through F(h), in which case, m=16.

Each node in the tree is associated with an existence map. In the preferred embodiment, the existence map is comprised of a bit mask of length m. Moreover, each possible m entry in a node of the radix search tree is associated with a unique bit in a particular position in the bit mask. By enabling the bit in the bit mask, the present invention indicates whether the entry associated with the bit is present in the node, i.e., whether the entry stores a pointer to a son node corresponding to a symbol value. By introducing the bit mask, m bits of overhead are added to each node having m possible entries.

The bit mask for a node which stores representations of only three of sixteen possible hexadecimal symbol values, e.g., 0(h), 2(h), and 8(h), can be represented as:

BIT MASK: 0 0 0 0 0 0 0 1 0 0 0 0 0 1 0 1

Entry for symbol value 0(h)
Entry for symbol value 2(h)
Entry for symbol value 8(h)

Those entries in the node which are empty, namely, 1(h), 3–7(h), and 9–F(h) in the above example, are not allocated memory locations. The existence map indicates which entries are present (and are thus allocated memory locations) by setting the corresponding bit in the existence map to a certain value, e.g., 1(b). The existence map further indicates which entries are not present by setting the corresponding bit position in the existence map to another value, e.g., 0(b).

If, for example, each entry in a node is 32 bits, introducing an existence map as shown above consumes additional memory space only if the node is full, i.e., all entries exist, otherwise memory space required for the node is substantially reduced. In a computing environment where a majority of tables stored in memory are sparsely populated, there is a very dramatic savings in memory requirements by instituting the use of an existence map.

With the addition of the existence map associated with each node, the present method controls the processor 302 to read the existence map in order to determine which entries are present in the node. The present method then controls the processor to further read the appropriate entry in the node as it searches for a particular symbol value of a key in the tree structure. However, in the preferred embodiment, with reference to FIG. 4, the existence map is placed in the pointer to the node, rather than simply associated with the node, e.g., as a header to an array, so that only one read is performed by the processor 302 to determine both the location of the node and which entries exist within the node.

Figure 4:
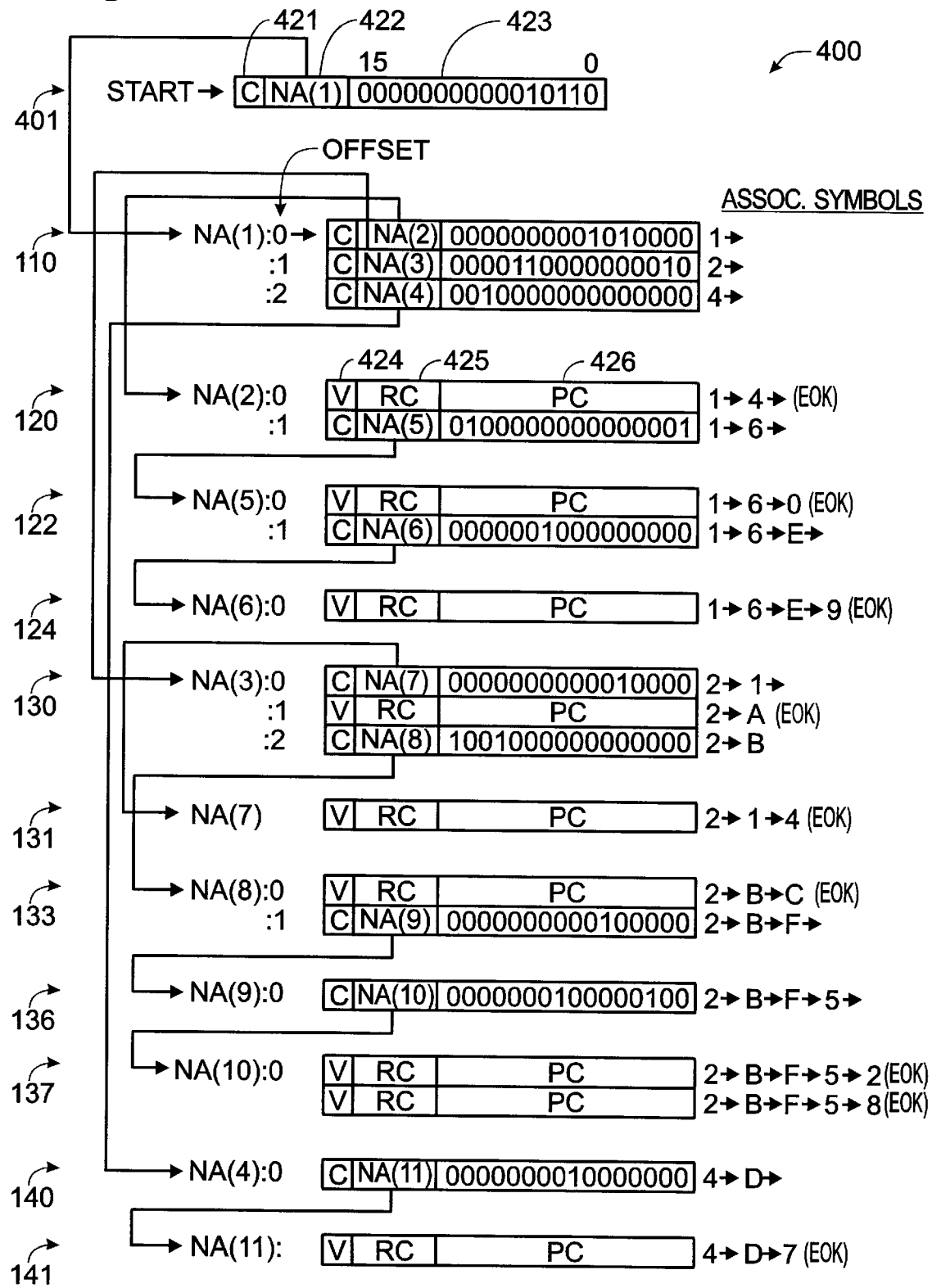
FIG. 4 illustrates an embodiment of the present invention.

FIG. 4 illustrates the memory layout 400 for the nodes in radix search tree 111 in which is stored the table of keys 100, according to the preferred embodiment of the present invention. Unlike the memory layout partially illustrated in FIG. 2 and utilized by the prior art radix search method, the preferred embodiment of the present invention provides an existence map in the same memory word as the pointer to a node to identify the entries present in the node. Each of the entries, in turn, likewise comprise a pointer to a son node and an existence map indicating which entries exist in the son node, and so on. As is the case with the prior art radix search tree, it is not necessary to store the actual symbol values comprising a key. However, unlike the prior art radix search tree, an entry in a node is associated with a particular symbol value based on the state of the corresponding existence map for the node, rather than the offset or location of the entry in the node. Because of the existence map, it is not necessary to reserve a memory location for each possible entry in a node in order to determine the corresponding symbol value associated with the entry.

Figure 1B:
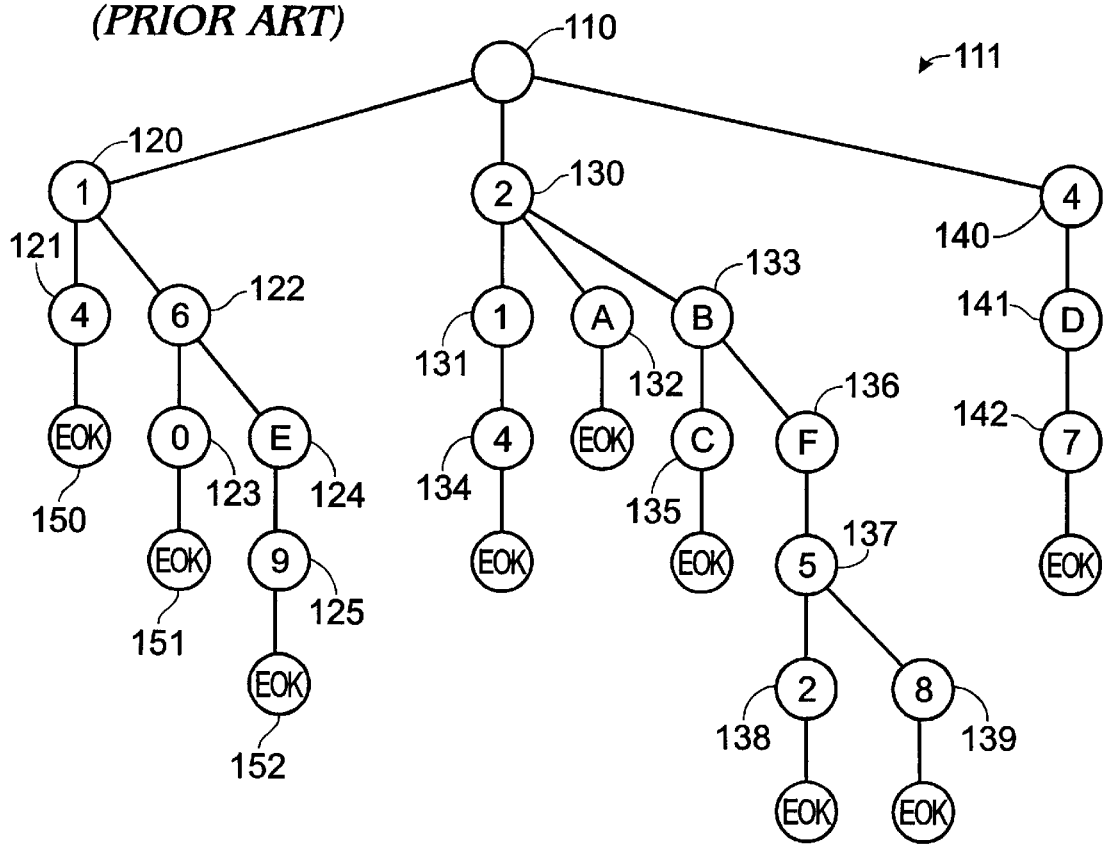
FIG. 1B is a logical tree data structure in which is stored the table of keys in FIG. 1A. The tree provides a structure by which the keys may be searched for using a radix search method.
Figure 2:
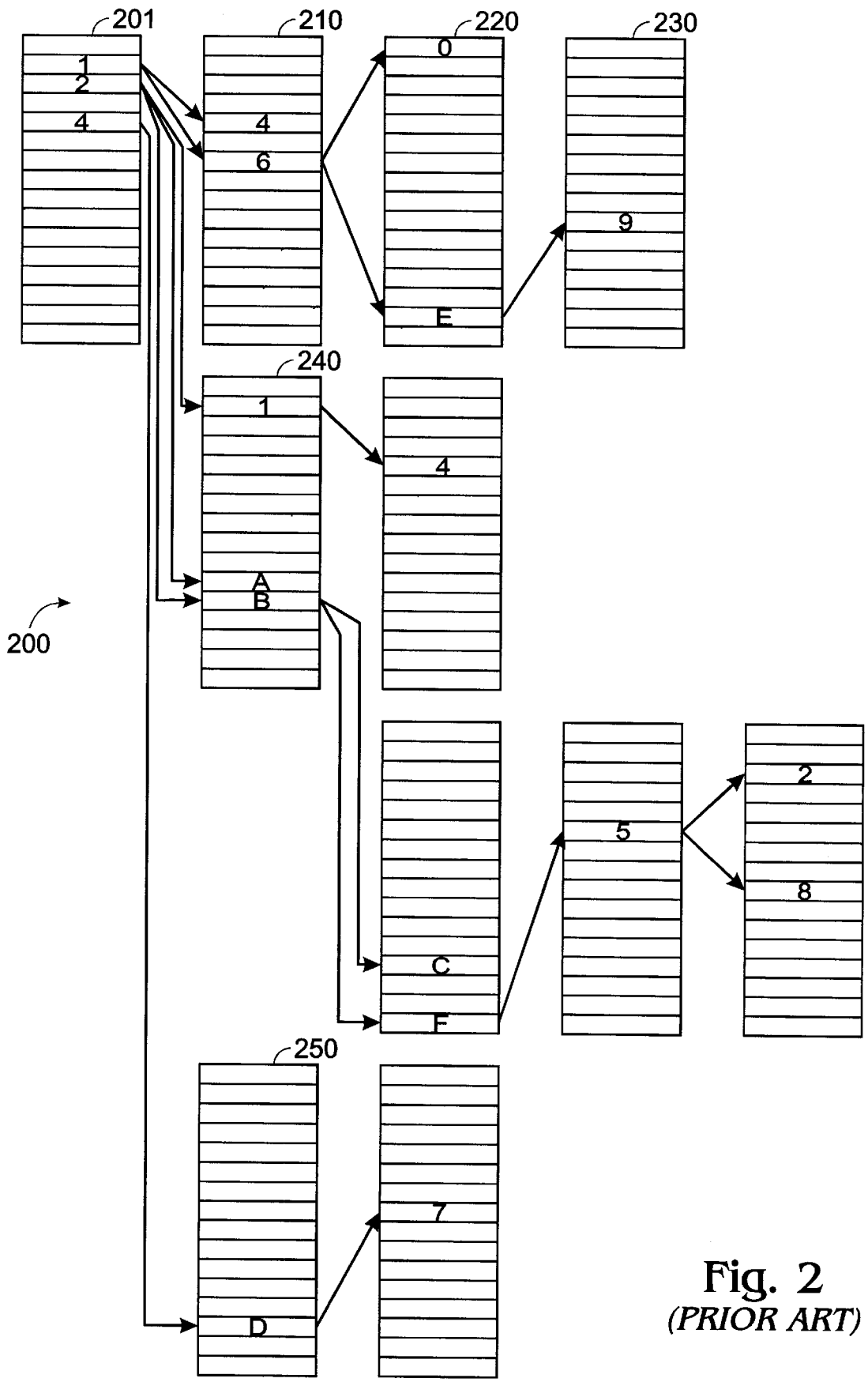
FIG. 2 illustrates the partial memory layout of the tree data structure in FIG. 1B.

With reference to FIG. 4, each entry in a node is comprised of three fields (as is the pointer 401 to root node 110 in FIG. 1B). The three fields are the continue/vector field 421, the next address/return code field 422, and the existence map/program counter field 423.

Fields 422 and 423 are interpreted differently depending on the contents of the continue/vector field 421, the meaning of which is explained below. If the contents of the continue/vector field indicate "continue", the contents of fields 422 and 423 are respectively interpreted as the next address (i.e., a pointer) and the existence map. If, on the other hand, the contents of the continue/vector field indicate "vector", the contents of fields 422 and 423 are interpreted as the return code and the program counter, respectively.

With respect to pointer 401, the contents of the continue/vector field 421 indicate "continue" ("C"), so field 422 is considered the next address field, and field 423 is considered the existence map field. The next address field 422 contains a pointer, as discussed above, to a son node in the tree. For example, the pointer 401 contains a pointer in the next address field 422 to the root node 110 in the tree.

As was mentioned above, in the preferred embodiment, an existence map is included in the same memory word along with the pointer to the next node in the tree. This is advantageous because the processor can obtain the pointer to and the existence map for a node in a single read operation. For example, existence map field 423 is illustrated following the next address field 422 in the pointer 401 to the root node 110. The existence map is a bit mask whose length m is determined by the m possible symbol values in each position, i.e., symbol, of a key. In the present example, the symbol values comprise the set of hexadecimal values. Hence, the bit mask is 16 bits long. The rightmost bit in the bit mask indicates the lowest symbol value, i.e., 0(h). The leftmost bit in the bit mask indicates the highest symbol value, i.e., F(h).

The existence map contains a bit mask in which each bit position in the mask is associated with a unique possible entry in the node corresponding to a symbol value. As illustrated in FIG. 4, the second, third, and fifth bit positions of the bit mask in the existence map field 423 in pointer 401 are enabled, indicating that symbol values 1(h), 2(h) and 4(h) are present in the first hexadecimal digit position of the keys in table 100. In other words, the existence map field 423 contains a bit mask of 0000000000010110(b) indicating that the root node 110 has entries associated with symbol values 1(h), 2(h), and 4(h), which is confirmed by reference to FIGS. 1A and 1B.

FIG. 4 illustrates the entries in the root node 110 at offsets 0, 1 and 2. The first entry at offset zero corresponds to symbol value 1(h), the second entry at offset one corresponds to symbol value 2(h), and the third entry at offset two corresponds to symbol value 4(h). Entries corresponding to symbol values other than 1(h), 2(h) and 4(h) are nonexistent, since these symbols do not appear in table 100, which is corroborated by inspecting the existence map field 423 in pointer 401. In node 110, the absence of entries corresponding to symbol values that are nonexistent collapses the 16 entries otherwise required under the prior art radix search method to just 3 entries, saving 13 memory locations for these unallocated entries.

A continue/vector field 421 at the beginning of each entry contains a value, illustrated in FIG. 4 in pointer 401 as "C" for continue, to indicate an end of key has not been detected and to continue to parse through the tree to reach the end of a string of symbols representing a key in table 100. When the continue/vector field 421 contains a value indicating "C" for continue, the two subsequent fields in the root node are interpreted as the next address field 422 and the existence map field 423, as described above.

Continuing on with the description of the improved radix search tree embodied by the present invention, and as illustrated in FIG. 4, the root node 110 has 3 entries. The first entry corresponds to symbol value 1(h). The next address field in the first entry of node 110 points to node 120 where the entries corresponding to symbol values 4(h) and 6(h) exist according to the contents of the existence bit map field in the first entry of node 110. With reference to FIG. 1B, node 120 has entries with pointers to nodes 121 and 122.

The second entry in root node 110 corresponds to symbol value 2(h), seen as node 130 in FIG. 1B. The next address field in the second entry of node 110 points to node 130 where entries corresponding to symbol values 1(h), A(h) and B(h) exist according to the existence map field in the second entry of node 110. Finally, the third entry in root node 110 corresponds to symbol value 4(h), seen as node 140 in FIG. 1B. The next address field in the third entry of root node 110 points to node 140, where an entry corresponding to symbol value D(h) exists. All three entries for root node 110 have the continue/vector field set to "C" for continue, to indicate the end of the key has not been reached, and to indicate that the next two fields in the entry should be interpreted as the next address field and existence map field, respectively.

The radix search method of the present invention continues to traverse the tree data structure illustrated in FIG. 1B in the manner described above, searching for the each successive symbol comprising a key value received as input. The search continues until an entry corresponding to a symbol being searched for is not found in the tree, i.e., the search fails, or the end of a key is found, i.e., the search succeeds.

In the preferred embodiment, an end of the search is detected when the continue/vector field in an entry is set to a value directing the search method to vector to an address. The contents of the existence map/program counter field are interpreted as the address to which to vector. The contents of the program counter field are loaded into a program counter. The processor then jumps to the program code segment beginning at the address specified by the program counter.

Thus, in the preferred embodiment of the invention, when a search is completed, the entry in a node representing the last symbol in the key is interpreted differently than described above. The continue/vector field is set to "V" for vector, indicating the end of the search, and the two fields following the continue/vector field are interpreted as a return code field and a program code counter field, as described above. For example, node 120 in FIG. 4 comprises two entries corresponding to symbol values 4(h) and 6(h), as described above. The key 14(h) from table 100 has been found, i.e., the end of the search has been reached, upon encountering the first entry corresponding to symbol value 4(h) in node 120. Thus, the continue/vector field at 424 is set to "V" for vector. The contents of the existence map/program counter field at 426 are then interpreted as an address of a program code segment to which to jump and is loaded into a program counter so the processor will jump to the program code segment and begin execution. The return code field is made available to the processor to, for example, convey additional information about the result of the search.

In the preferred embodiment, a search of the tree fails when the existence map associated with a pointer to a node indicates an entry corresponding to a particular symbol does not exist in the node. For example, suppose the string of symbols 16A(h) is being searched for in table 100. The pointer 401 to the root node 110 contains an existence map field 423 which indicates the first entry corresponding to the symbol 1(h) is present in the root node, so the search continues on to the first entry in the root node. At the root node, the first entry, in turn, contains an existence map in which the fifth and seventh bit positions (counting from the rightmost bit position) are enabled, indicating entries corresponding to the symbol values 4(h) and 6(h) can be found at the node identified by the next address field (i.e., son node 120). The search is looking for the symbol 6(h) at this point. Because the fourth bit position in the existence map is also enabled, the search method anticipates the entry corresponding to the symbol value 6(h) as the second entry in node 120. The next address field in the first entry in the root node 110 points to node 120, so the search continues to node 120.

At node 120, the second entry corresponding to the symbol value 6(h) is present as was indicated by the existence map in the first entry of node 110. Thus far, the first two symbols in the string of symbols 1-6-A representing the key 16A(h) have been found, or, more properly, entries containing a pointer corresponding to the symbol values have been found. However, at this point, the first and fifteenth bit positions in the existence map for the second entry of node 120 are enabled, indicating the radix search tree only has son nodes corresponding to symbols 0(h) and E(h) (which are illustrated as nodes 121 and 122 in FIG. 1B). The eleventh bit position is set to zero, i.e., is not enabled, indicating a son node does not exist which corresponds to the symbol value A(h). Thus, the key 16A(h) is not in the tree, and the search fails.

It is important to note that, in the case of a failed search, the search method does not "vector", or jump, to a program code segment. Rather, the search method continues executing the current program code segment at the instruction pointed to by the program counter. This obviates the need to create an entry in a node to specify a program counter providing a memory location of a segment of program code to which to jump when a search fails.

Logic for Performing Improved Radix Search Method

One of the advantages of prior art radix search techniques over other prior art search techniques is the speed at which the radix search is performed. The search algorithm for prior art radix search methods generally is based on a looping construct within which the search performs a shift function and an index function to traverse the tree. However, the introduction of the existence map as described above in the preferred embodiment of the present invention makes such an approach untenable for two reasons. First, an entry may not exist in a node. Second, if the entry does exist, it may not be at the same offset within a node if other entries have been inserted or deleted ahead of the entry. For example, in the root node 110, the third entry contains a pointer to node 140 which corresponds to symbol 4(h). If, however, the root node had entries containing pointers to other nodes corresponding to the symbols 0(h) and/or 3(h), one or both of those entries would precede the entry corresponding to symbol 4(h), causing the entry to be the fourth, or possibly fifth entry in node 110.

In the present search method, a tradeoff exists between the speed of the search and utilization of memory resources. By providing an existence map, memory space is conserved, but the search process takes longer because of the additional computations performed by the processor in connection with reading and processing the existence map. The additional overhead required by the search method to account for and process the, possibly dynamically changing, existence map slows down the search method. This problem is overcome by providing logic to perform the search method.

The logic circuit embodied by the present invention calculates the correct offset for an entry in a node. For example, the actual offset in a node to the entry corresponding to symbol 1(h) can be calculated as zero, if an entry corresponding to the symbol 0(h) does not exist. The correct offset can also be calculated as one if the entry corresponding to the symbol 0(h) does exist, as determined by the existence map for the node. Expressed mathematically, the actual offset Xr for a symbol value x is:

$$\text{Actualoffset}[X] = (\Sigma_{i=0}^{x} \text{existence\_bit}[i]) - 1$$

As described below, the preferred embodiment of the present invention carries out the above arithmetic expression in a logic circuit.

Figure 5:
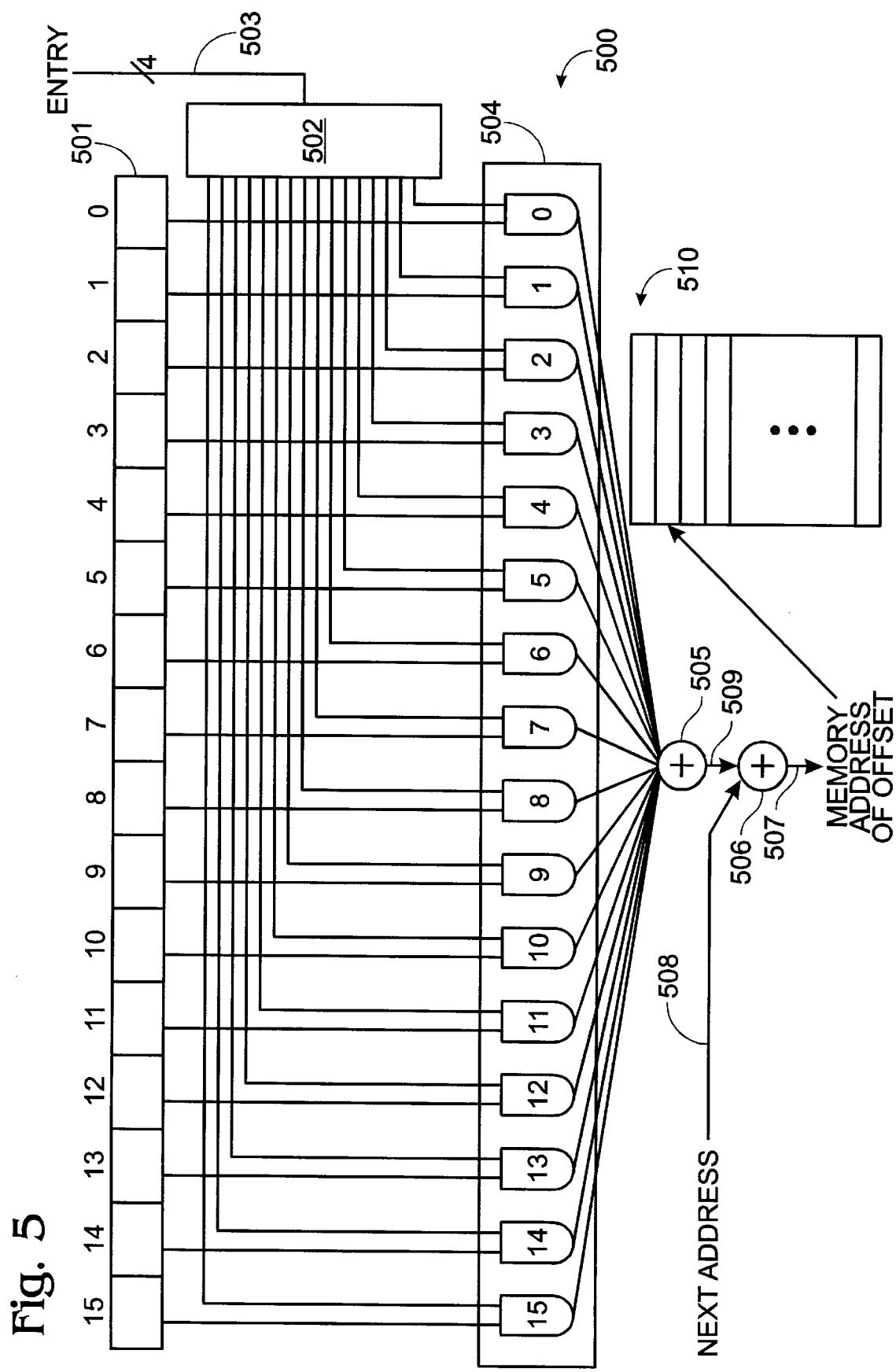
FIG. 5 is a block diagram of an embodiment of the present invention.

With reference to FIG. 5, a block diagram of a logic circuit 500 for computing the actual offset of an entry within a node is shown. The logic circuit is comprised of a register 501 into which an existence map is loaded. In the preferred embodiment, the existence map is comprised of a bit mask. In the illustration, register 501 is sixteen bits wide, allowing for an bit mask of 16 bit positions. However, register 501 could be any width desired, so long as it is able to accommodate a length of m bits in the existence map bit mask. Each of the bit locations in register 501 provide an input to an equal number of two-input Boolean AND gates, collectively referred to at 504. The other input to each of the AND gates is coupled to an output provided by block 502.

Block 502 accepts as input an entry number indicating an entry that corresponds to a symbol value x derived from a key received as input to the search process. The entry number indicates the highest entry in the node (i.e., the entry with the greatest relative offset from the memory address of the first entry in the node) at which the symbol value x, or a pointer to the symbol value x, would be stored if all entries were allocated in the node for each of m possible symbols. For example, the entry number for the symbol value 5(h), is 5(h).

Block 502 drives the rightmost, or lowermost x-1 input lines to AND gates 504 high, according to the entry number x received by block 502 from the search process, as described below. The x through m input lines to AND gates 504 remain low. Block 502 is comprised of logic circuitry well known to those of ordinary skill in the art of logic circuit design.

The AND gates 504 mask off certain bits of the existence map bit mask to simplify the sum circuit 505. More specifically, AND gates 504 mask off bits x through m of the existence map bit mask. Each AND gate outputs a binary state of 0 or 1 based on the state of its two inputs, i.e., both inputs must be driven to a level indicating a binary one for the output to be driven to a binary one, otherwise the output remains at binary zero. The sum circuit 505 adds the binary values provided by each AND gate to produce an offset value indicating the offset within a node, e.g., node 510, of the entry indicated by the entry number provided as input at block 502. The offset value is output on line 509 to sum circuit 506.

Sum circuit 506 receives as input the contents of the next address field via line 508, as well as the offset value output on line 509. The memory address of the offset is computed by adding the contents of the next address field and the offset value. The memory address of the offset is then provided as output on line 507, which the search method retrieves for use in accessing the entry in node 510.

An example of the operation of logic circuit 500 will now be provided. As mentioned above, an entry in a node comprises a pointer (in the next address field) to a son node and a bit mask (in the existence map field) indicating which entries are present in the son node. Because not all entries may be present in the son node according to the preferred embodiment of the present invention, and because those entries which are present in the son node can change dynamically, the search method must compute the offset of an entry in the son node before the entry can be accessed each time. To compute the offset of the entry in the son node, the existence map from an entry in a parent node is loaded into register 501. For example, to compute the offset of the entry corresponding to symbol A(h) in the son node 130 of FIG. 1B, the existence map stored with the pointer to node 130 in the second entry of root node 110 is loaded into register 501. Thus, register 501 contains the bit mask 0000110000000010(b).

The entry corresponding to the symbol A(h) in son node 130, if all lower entries 0(h)–9(h) were present in the son node, would be the eleventh entry. An entry number indicating the eleventh entry corresponding to symbol A(h) is thus input in to block 502. The line 503 indicates a four-bit wide data path, but the data path can of any size appropriate to convey the entry number. Using the entry number input on line 503, block 502 enables an input to each AND gate in 504 up to but not including the AND gates corresponding to the bit positions in the bit mask at or above the entry number input on line 503. In other words, for an entry number x, the inputs to x-1 AND gates are driven high. Thus, if the entry number is A(h), an input to each of AND gates 0 through 9 is enabled. Conversely, the input to each of the AND gates corresponding to and receiving input from bit positions 10(d) through 15(d) in register 501 is not enabled (i.e., is driven low) by block 502. Thus, the inputs to AND gates 15 through 0 provided by block 502 are as follows: 0000001111111111(b).

The AND gates provide for a bit mask function. The bit mask function is performed for each bit of the bit mask in register 501. The result of the mask function is as follows:

| Input from register 501: | 0 0 0 0 1 1 0 0 0 0 0 0 0 0 1 0 |
| Input from block 502: | 0 0 0 0 0 0 1 1 1 1 1 1 1 1 1 1 |
| Output from AND gates: | 0 0 0 0 0 0 0 0 0 0 0 0 0 0 1 0 |

The output of AND gates 504 is added together by sum circuit 505. In the example above, the result output by sum circuit 505 is 1. The value output by sum circuit 505 indicates the offset of the entry being searched for in the son node, in this case, the offset of the entry corresponding to the symbol A(h) in son node 130. Thus, the entry in son node 130 corresponding to symbol A(h) is at offset 1, i.e., the second entry, in son node 130.

The result output by sum circuit 505, i.e., the offset, is provided as input to sum circuit 506. Sum circuit 506 also receives as input the contents of the next address field, i.e., the pointer to the son node 130, on line 508. Sum circuit 506 adds the offset output by sum circuit 505, in this example, the value 1, to the contents of the next address field. The result, output on line 507, provides the memory address of the offset of the entry corresponding to the symbol A(h) in son node 130.

Conclusion

There are, of course, alternatives to the described embodiment which are within the understanding of one of ordinary skill in the relevant art. The present invention is intended to be limited only by the claims presented below.

We claim:

1. A computer-implemented method for calculating a memory address of an entry in a node in a tree data structure representing a sparse table in a memory of a computer system, the node having a plurality of entries, comprising:

a) reading an existence map associated with the node, the existence map indicating which of the plurality of entries exist in the node;

b) receiving an entry number;

c) producing a bit mask given the entry number;

d) masking the existence map with the bit mask to produce a masked existence map;

e) calculating an offset for the entry given the masked existence map; and f) adding the offset for the entry to a pointer for the node to yield the memory address of the entry in the node.

2. The computer implemented method of claim 1, wherein calculating a memory address of an entry in a node in a tree data structure in a memory of a computer system comprises calculating a memory address of an entry in a node in a radix search tree data structure in a memory of a computer system.

3. The computer implemented method of claim 1, wherein reading an existence map associated with the node comprises reading a memory word comprising both a pointer to the node and the existence map associated with the node.

4. The computer implemented method of claim 1, wherein reading the existence map associated with the node comprieses reading an existence bit mask having a plurality of bits enabled to indicate which of the plurality of entries exist in the node.

5. The computer implemented method of claim 1, wherein producing a bit mask given the entry number comprises producing a bit mask having enabled only bits for entries less than the entry number.

6. The computer implemented method of claim 1, wherein producing a bit mask given the entry number comprises producing a bit mask having disabled only bits for entries equal to or greater than the entry number.

7. The computer implemented method of claim 1, wherein calculating an offset for the entry given the masked existence map comprising summing the bits comprising the masked existence map.

8. In a radix search tree data structure representing a sparse table in a memory of a computer system, the radix search tree comprising a plurality of nodes each having a plurality of entries, a computer implemented method for determining a memory address of an entry in a son node, comprising:

a) reading an entry in a parent node, the entry in the parent node comprising a pointer to the son node and an existence map, the existence map comprising an existence bit mask having a plurality of bits enabled to indicate which of the plurality of entries exist in the son node;

b) receiving an entry number corresponding to a symbol value being searched for in the son node;

c) producing a bit mask having bits enabled for entries less than the entry number;

d) masking the existence bit mask and the bit mask to produce a partial existence bit mask in which bits for entries equal to and greater than the entry number are discarded;

e) calculating an offset for the entry by summing the bits in the partial existence bit mask;

f) calculating the memory address of the entry in the son node by adding the offset to the pointer for the son node.

9. The method of claim 2, wherein masking the existence bit mask and the bit mask to produce a partial existence bit mask comprises performing a Boolean AND of the existence bit mask and the bit mask.

10. An apparatus providing for a memory address of an entry in a node in a tree data structure representing a sparse table in a memory of a computer system, the node having a plurality of entries, comprising:

a register to store an existence map associated with the node;

a converter to convert an entry number into a bit mask;

a Boolean logic unit to mask the existence map and the bit mask and to provide a masked existence map as an output;

a first sum circuit to provide an offset by adding a plurality of bits comprising the masked existence map; and a second sum circuit to provide the memory address of the entry in the node by adding the offset to a pointer for the node.

11. The apparatus of claim 10, wherein the Boolean logic unit comprises AND logic to provide the masked existence map.

* * * * *